United States Patent
Prabhakar et al.

(10) Patent No.: US 11,758,000 B2
(45) Date of Patent: Sep. 12, 2023

(54) SYSTEM AND METHOD FOR SURVIVAL TIME DELIVERY IN 5GC

(71) Applicant: Apple Inc., Cupertino, CA (US)

(72) Inventors: Alosious Pradeep Prabhakar, Singapore (SG); Han Pu, Hong Kong (HK); Jordi Agud Ruiz, Meguro-Ku (JP); Krisztian Kiss, Hayward, CA (US); Mohammed Sadique, Auburn (AU); Rohit R. Matolia, Surat (IN); Srinivasan Nimmala, San Jose, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 17/593,672

(22) PCT Filed: May 5, 2021

(86) PCT No.: PCT/US2021/070514
§ 371 (c)(1),
(2) Date: Sep. 22, 2021

(87) PCT Pub. No.: WO2021/226634
PCT Pub. Date: Nov. 11, 2021

(65) Prior Publication Data
US 2022/0311827 A1    Sep. 29, 2022

(30) Foreign Application Priority Data

May 5, 2020    (IN) .............................. 202041019174

(51) Int. Cl.
*H04L 67/141* (2022.01)
*H04W 76/10* (2018.01)
(Continued)

(52) U.S. Cl.
CPC .......... *H04L 67/141* (2013.01); *H04L 47/28* (2013.01); *H04L 69/28* (2013.01);
(Continued)

(58) Field of Classification Search
CPC ....... H04L 67/141; H04L 47/28; H04L 69/28; H04L 47/70; H04L 12/841; H04L 29/08;
(Continued)

(56) References Cited

U.S. PATENT DOCUMENTS

| | | | |
|---|---|---|---|
| 2020/0120536 A1* | 4/2020 | Prakash | H04W 72/12 |
| 2020/0137615 A1* | 4/2020 | Joseph | H04W 24/02 |

(Continued)

FOREIGN PATENT DOCUMENTS

KR    20200033094    3/2020

OTHER PUBLICATIONS

ZTE Corporation, "Clarification of TSN QoS monitoring"; 3GPP TSG-SA WG6 Meeting #35; S6-200253; Jan. 19, 2020; 3 sheets.
(Continued)

*Primary Examiner* — Mewale A Ambaye
(74) *Attorney, Agent, or Firm* — Fay Kaplun & Marcin, LLP (57) ABSTRACT

A fifth-generation core network (5GC) provides 5G radio access network (RAN) services to a user equipment (UE) in a time-sensitive communications (TSC) network (TSN). This includes receiving a protocol data unit (PDU) session establishment request from the UE, the PDU session establishment request including an industrial Internet of Things (IIoT) vertical or application type, identifying a TSN application function (AF) relating to the IIoT vertical or application type, determining quality of service (QoS) parameters for communications between the UE and the 5G RAN based on the identified TSN AF, the QoS parameters including a survival time for the IIoT vertical or application type and establishing a PDU session with the UE when the QoS parameters including the survival time are satisfied.

20 Claims, 9 Drawing Sheets

(51) Int. Cl.
　　　*H04W 28/08*　　　(2023.01)
　　　*H04L 47/28*　　　(2022.01)
　　　*H04L 69/28*　　　(2022.01)
　　　*H04W 28/02*　　　(2009.01)

(52) U.S. Cl.
　　　CPC ... *H04W 28/0268* (2013.01); *H04W 28/0975* (2020.05); *H04W 76/10* (2018.02)

(58) Field of Classification Search
　　　CPC ............. H04W 76/10; H04W 28/0975; H04W 28/0268; H04W 4/70; H04W 67/12
　　　See application file for complete search history.

(56) References Cited

U.S. PATENT DOCUMENTS

2020/0162366 A1*　5/2020　Vrzic ..................... H04L 45/16
2020/0259896 A1*　8/2020　Sachs .................... H04J 3/0667
2021/0136555 A1*　5/2021　Paladugu ............... H04W 4/80

OTHER PUBLICATIONS

Samsung et al., "Key issue on QoS Enhancement for Deterministic Applications in 5GS"; 3GPP SA WG2 Meeting #136; S2-1911607; Nov. 8, 2019; 3 sheets.

\* cited by examiner

| Service Name | Service Operations | Operation Semantics | Example consumer(s) |
|---|---|---|---|
| Naf_TSC | Support | Request/Response | NEF, NRF |
| | Update | Request/Response | NEF, NRF |
| | Subscribe | Subscribe/Notify | NEF, NRF |
| | Notify | | NEF, NRF |

Fig. 8

| Service Name | Service Operations | Operation Semantics | Example consumer(s) |
|---|---|---|---|
| Nnef_TSC | AFSupport | Request/Response | PCF |
| | | Subscribe/Notify | PCF |

Fig. 9

SYSTEM AND METHOD FOR SURVIVAL TIME DELIVERY IN 5GC

BACKGROUND INFORMATION

Time-sensitive networking (TSN) is a technology for deterministic real-time communication. Time synchronization and schedule sharing between components enable a maximum latency for traffic through the various network components. Some vertical domains, including, e.g. factories and other industrial domains, comprise cyber-physical systems (CPS) having control applications with strict deterministic requirements. 5G New Radio (NR) has been designed for industrial internet of things (IIoT) communication, and the convergence of 5G and TSN may provide both flexibility and low latency for industrial settings.

Communication service availability is an important service performance requirement for cyber-physical 5G-TSN systems. The communication service availability requirement is a combination of latency, survival time and reliability requirements for 5G systems. The survival time is the time that an application using a communication service may continue without an anticipated message. Survival times for various applications are standardized in 3GPP TS 22.104 5.2 and may be dependent on the time-sensitivity of the application.

The system is considered unavailable to the cyber-physical TSN application when an expected message is not received by the application after the application's survival time expires. In other words, the system is considered unavailable when a transfer time, i.e., actual latency, for an expected message is greater than the sum of the maximum end-to-end latency and survival time. Thus, it is important for the 5G system to know the survival time for a TSN application to which it provides services.

SUMMARY

In some exemplary embodiments a method is performed by a fifth-generation core network (5GC) providing 5G radio access network (RAN) services to a user equipment (UE) in a time-sensitive communications (TSC) network (TSN). The method includes receiving a protocol data unit (PDU) session establishment request from the UE, the PDU session establishment request including an industrial Internet of Things (IIoT) vertical or application type, identifying a TSN application function (AF) relating to the IIoT vertical or application type, determining quality of service (QoS) parameters for communications between the UE and the 5G RAN based on the identified TSN AF, the QoS parameters including a survival time for the IIoT vertical or application type and establishing a PDU session with the UE when the QoS parameters including the survival time are satisfied.

In further exemplary embodiments a system is provided that has one or more network components configured to provide a fifth-generation core network (5GC) providing 5G radio access network (RAN) services to a user equipment (UE) in a time-sensitive communications (TSC) network (TSN). The one or more network components are configured to receive a protocol data unit (PDU) session establishment request from the UE, the PDU session establishment request including an industrial Internet of Things (IIoT) vertical or application type, identify a TSN application function (AF) relating to the IIoT vertical or application type, determine quality of service (QoS) parameters for communications between the UE and the 5G RAN based on the identified TSN AF, the QoS parameters including a survival time for the IIoT vertical or application type and establish a PDU session with the UE when the QoS parameters including the survival time are satisfied.

In still further exemplary embodiments, one or more non-transitory computer readable storage media are provided. The non-transitory computer readable storage media includes a set of instructions that when executed cause one or more processors to perform operations. The operations include receiving a protocol data unit (PDU) session establishment request from a user equipment (UE) in a time-sensitive communications (TSC) network (TSN), the PDU session establishment request including an industrial Internet of Things (IIoT) vertical or application type, identifying a TSN application function (AF) relating to the IIoT vertical or application type, determining quality of service (QoS) parameters for communications between the UE and a 5G radio access network (RAN) based on the identified TSN AF, the QoS parameters including a survival time for the IIoT vertical or application type and establishing a PDU session with the UE when the QoS parameters including the survival time are satisfied.

DETAILED DESCRIPTION

The exemplary embodiments may be further understood with reference to the following description and the related appended drawings, wherein like elements are provided with the same reference numerals. The exemplary embodiments describe methods for obtaining a survival time for a user equipment (UE) in an industrial Internet of things (IIoT) vertical or application and including the survival time in a quality of service (QoS) requirement. The methods may be performed in the core network (CN) of a 5G NR network, e.g., the 5GC, and include identifying the application function (AF) for the TSN vertical/application the UE is being used for and retrieving a survival time therefrom. The survival time is subsequently transmitted via various network components to the UE when a PDU session is established between the UE and the 5GC. Each of these operations will be described in greater detail below.

Figure 1:
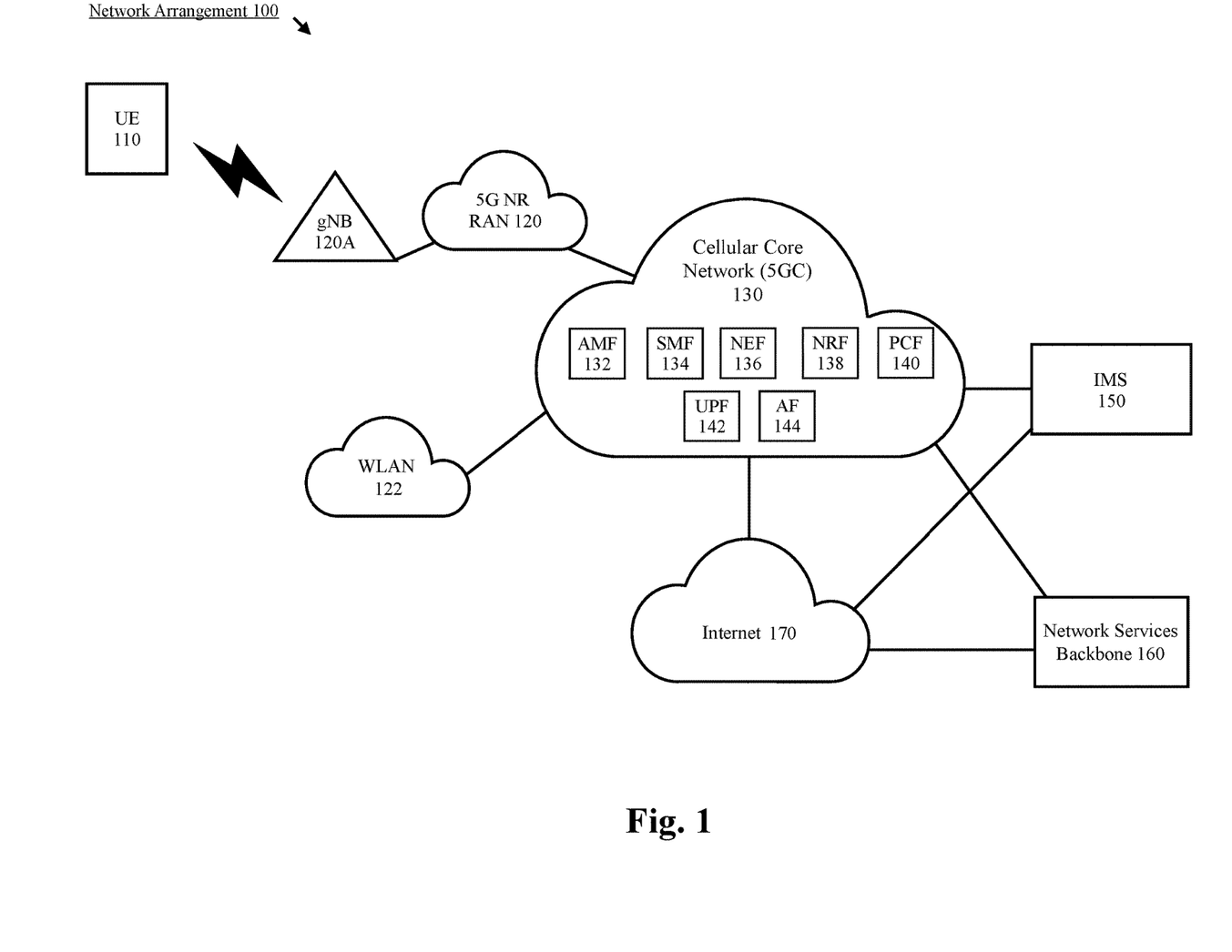
FIG. 1 shows a network arrangement according to various exemplary embodiments.

FIG. 1 shows a network arrangement 100 according to various exemplary embodiments. The network arrangement 100 includes a UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes. In the present embodiments, the UE 110 may be an IIoT UE in an industrial factory system configured for low latency TSN communications.

The UE 110 may be configured to communicate directly with one or more networks. In the example of the network arrangement 100, the UE 110 may wirelessly communicate with a 5G new radio (NR) radio access network (5G NR RAN) 120 and a wireless local access network (WLAN) 122. However, the UE 110 may also communicate with other types of networks (e.g., an LTE RAN, a legacy RAN etc.). The UE 110 may also communicate with networks over a wired connection. Therefore, the UE 110 may include a 5G NR chipset to communicate with the 5G NR RAN 120 and an ISM chipset to communicate with the WLAN 122.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR RAN 120 via a next generation Node B (gNB) 120A. Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the gNB 120A of the 5G NR RAN 120). As mentioned above, the use of the 5G NR RAN 120 is for illustrative purposes and any type of network may be used. For example, the UE 110 may also connect to the LTE-RAN (not pictured) or the legacy RAN (not pictured).

In addition to the networks 120 and 122 the network arrangement 100 also includes a cellular core network (CN) 130, i.e. the 5GC. The cellular core network 130 may be considered to be the interconnected set of components that manages the operation and traffic of the cellular network. In the present embodiments, the components of the CN 130 include an access and mobility management function (AMF) 132, a session management function (SMF) 134, a network exposure function (NEF) 136, a network function (NF) repository function (NRF) 138, a policy control function (PCF) 140, a user plane function (UPF) 142 and an application function (AF) 144. However, an actual cellular core network may include various additional components performing any of a variety of different functions.

The AMF 132 performs operations related to mobility management such as, but not limited to, paging, non-access stratum (NAS) management and registration procedure management between the UE 110 and the cellular core network 130. The AMF 132 may provide transport for session management (SM) messages between the UE 110 and the SMF 134, and act as a transparent proxy for routing SM messages. Reference to a single AMF 132 is merely for illustrative purposes, an actual network arrangement may include any appropriate number of AMFs.

The SMF 134 performs operations related to session management (SM) (e.g., session establishment, modification and release, including tunnel maintenance between the UPF 142 and the gNB 120A). SM may refer to management of a PDU session, and a PDU session or "session" may refer to a PDU connectivity service that provides or enables the exchange of PDUs between the UE 110 and a data network. PDU sessions may be established upon UE request, modified upon UE and 5GC request, and released upon UE and 5GC request.

The NEF 136 performs operations related to securely exposing the services and capabilities provided by 3GPP network functions for third parties, internal exposure/re-exposure, Application Functions (e.g., AF 144), edge computing or fog computing systems, etc. The NEF 136 may also receive information from other network functions (NFs) based on exposed capabilities of other network functions. This information may be stored at the NEF 136 as structured data, or at a data storage NF using standardized interfaces. The stored information can then be re-exposed by the NEF 136 to other NFs and AFs, and/or used for other purposes such as analytics.

The NRF 138 performs operations related to discovery functions, receiving NF discovery requests from NF instances, and providing the information of the discovered NF instances to the NF instances. The NRF 138 also maintains information of available NF instances and their supported services.

The PCF 140 performs operations related to providing policy rules to control plane function(s) to enforce and may also support a unified policy framework to govern network behavior.

The UPF 142 performs operations related to intra-RAT and inter-RAT mobility, interconnecting an external PDU session to a data network, and supporting multi-homed PDU sessions. The UPF 142 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), perform transport level packet marking in the uplink and downlink, and perform downlink packet buffering and downlink data notification triggering.

The AF 144 performs operations related to traffic routing, accessing the NEF 136, and interacting with the policy framework for policy control. An AF may be specific to a particular application to which the 5G NR network is providing services. For example, a TSN AF may include information for a UE configuration in a TSN network, e.g. a UE performing an assembly line task in an industrial setting.

The network arrangement 100 also includes the Internet 170, an IP Multimedia Subsystem (IMS) 150, and a network services backbone 160. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 170 to provide the multimedia services to the UE 110. The network services backbone 160 is in communication either directly or indirectly with the Internet 170 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
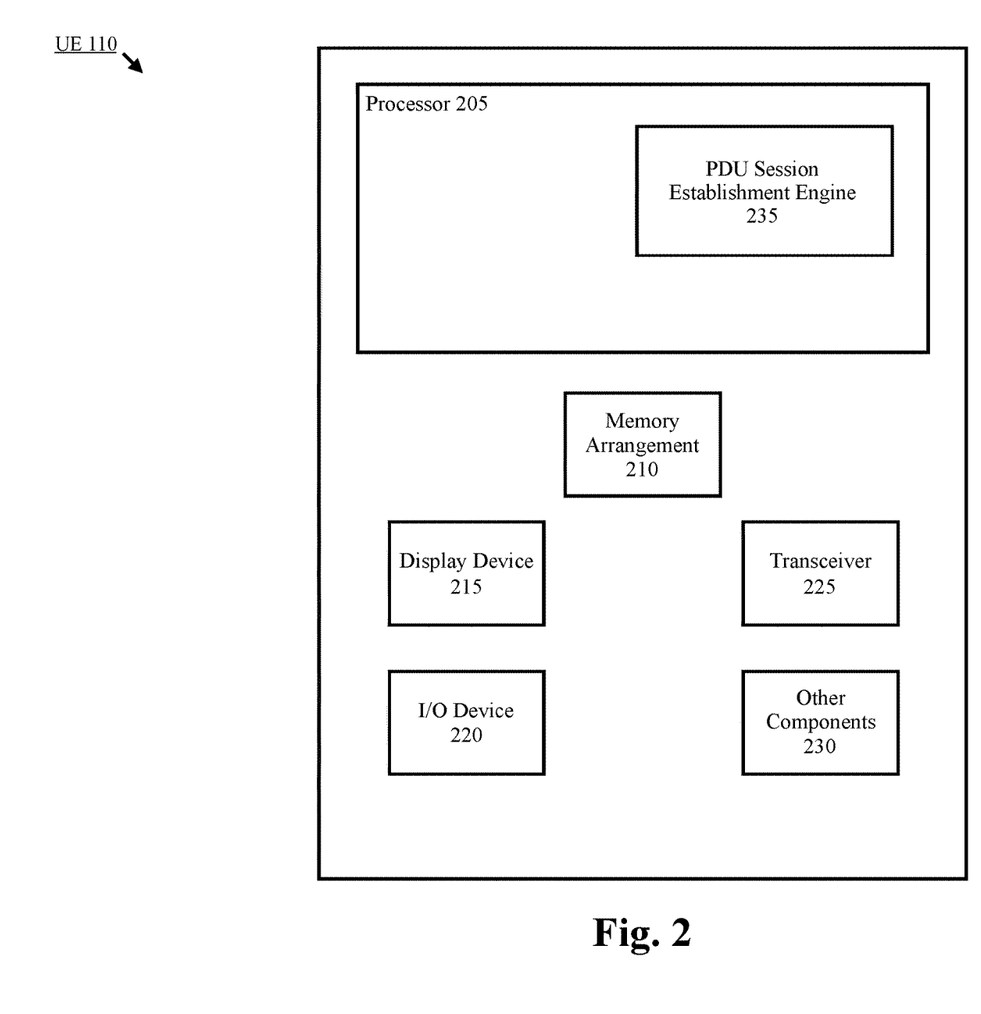
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a PDU session establishment engine 235 for establishing a PDU session with the 5GC. The PDU session establishment engine 235 may perform operations including transmitting an IIoT vertical/application type for the UE to the SMF, wherein the SMF uses the IIoT vertical/application identification to retrieve a survival time for the IIoT vertical/application via various CN components, to be described in detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122, the legacy RAN 124 and the WLAN 126. Accordingly, the transceiver 225 may operate on a variety of different frequencies or channels (e.g., set of consecutive frequencies).

As mentioned above, an IIoT UE in a TSN network, such as a robot in an assembly line at a factory, may be configured with a 5G NR connection and receive services from the 5G NR RAN. When the IIoT UE requests a PDU session, e.g., transmits a PDU session establishment request, the 5GC 130 should know which application function (AF) 144, e.g. which TSN AF, from which to request a corresponding QoS. To obtain this information, the 5GC 130 should be provided with the capability of the AF 144, e.g., which vertical or application the AF 144 serves.

Those skilled in the art will understand that the 5GC 130 may have multiple AFs 144 (and the other described functions, e.g., SMF 134, NEF 136, NRF 138, PCF 140, UPF 142) and the operations described herein for each of these functions may be performed by one or more of the functions. Thus, the use of the reference numeral (e.g., AF 144) may refer to a specific AF (e.g., the TSN AF for an application being executed by a UE 110) or to the AFs in general. This also holds true for the other functions of the 5GC 130 described herein.

In brief, for the 5GC 130 to obtain the TSN AF 144 capabilities, the NEF 136 may be configured to request the AF 144 capabilities. The AF 144 may register its services to the NEF 136/NRF 138, and the NEF 136/NRF 138 may maintain a repository of AF IDs and the IIoT vertical or applications the AF 144 serves. When the PCF 140 requests QoS parameters for a TSN PDU session, the NEF 136 may provide the details of the corresponding TSN AF 144.

The following exemplary embodiments include various signaling diagrams that include messages that are exchanged between the various components and/or functions. These messages may be provided with a message name and/or an information element (IE) name. It should be understood that these names are only exemplary and that messages and/or IEs that provide the same information may have different names in different embodiments. Those skilled in the art will understand the various functionalities and/or information provided in each message and may apply this to other embodiments.

Figure 3:
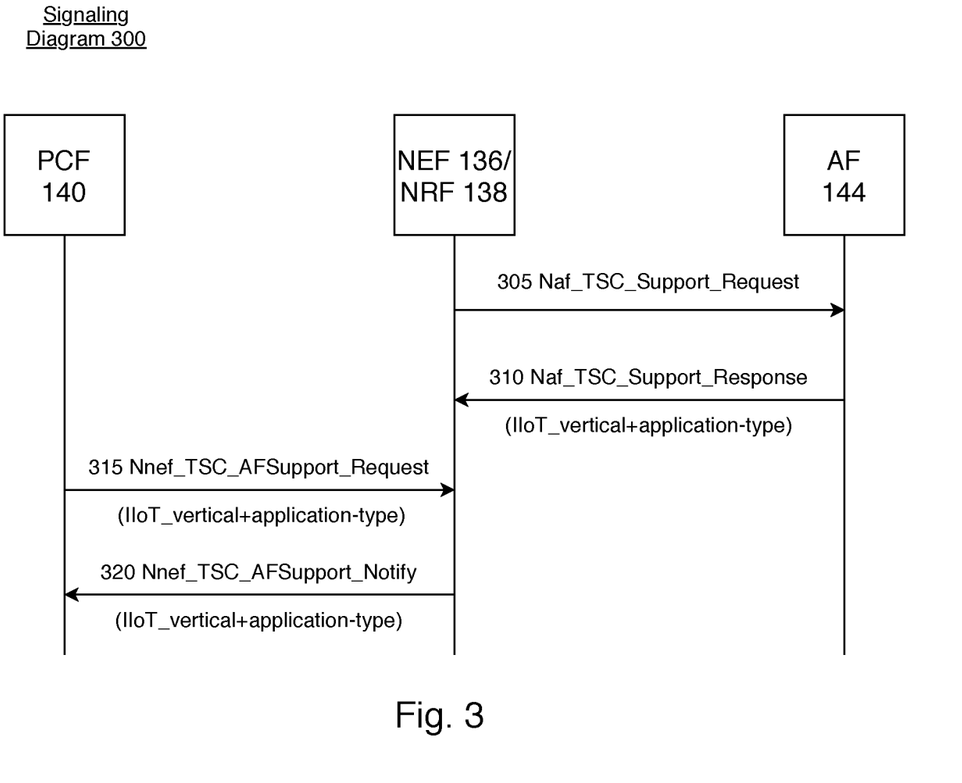
FIG. 3 shows a signaling diagram for a time-sensitive network (TSN) application function (AF) to provide its capabilities to the 5GC according to various exemplary embodiments.

FIG. 3 shows a signaling diagram 300 for a time-sensitive network (TSN) application function (AF) 144 to provide its capabilities to the 5GC 130 according to various exemplary embodiments. In 305, the NEF 136/NRF 138 signals to the AF 144 a time-sensitive communications (TSC) support request on the Naf interface using, e.g. an Naf_TSC_Support_Request IE. This service may be used by the NEF 136 to inquire about the TSC support and/or capabilities of the AF 144.

In 310, the AF 144 signals to the NEF 136/NRF 138 a TSC support response on the Naf interface using, e.g. an Naf_TSC_Support_Response. This service may be used by the AF 144 to provide the TSC support and/or capability of the AF 144 to the NEF 136/NRF 138. When the AF 144 is a TSN AF 144, the support details may include an IIoT vertical type it supports (e.g., factories of the future) and an IIoT application type (e.g., robotics).

In 315, the PCF 140 signals to the NEF 136/NRF 138 a TSC support request on the Nnef interface using, e.g. an Nnef_TSC_AFSupport_Request. This service may be used by the PCF 140 to request TSN AF(s) 144 information for an IIoT vertical and/or application type(s). Although signal 315 is shown in FIG. 3 as occurring after the NEF/NRF inquiry, the signal 315 may be transmitted prior to the NEF/NRF inquiry.

In 320, the NEF 136/NRF 138 signals to the PCF 140 a TSC support notification on the Nnef interface using, e.g. a Nnef_TSC_AFSupport_Notify. This service may be used by the NEF 136 to notify the PCF 140 about the TSN AF(s) 144 connected to the 5GC 130 via the NEF 136 and the IIoT support provided by each TSN AF 144.

Accordingly, via the signaling of FIG. 3, the NEF 136/NRF 138 obtains information related to the capabilities of the particular TSN AF 144. The NEF 136/NRF 138 may obtain this information for multiple AFs 144 and maintain a repository of AF IDs and the IIoT vertical/application the AF services. Thus, when the PCF 140 requests QoS parameters for a TSC PDU session, the NEF 136/NRF 138 may provide the details of the corresponding AF 144, to be described in further detail below with respect to the method 600 of FIG. 6.

Figure 8:
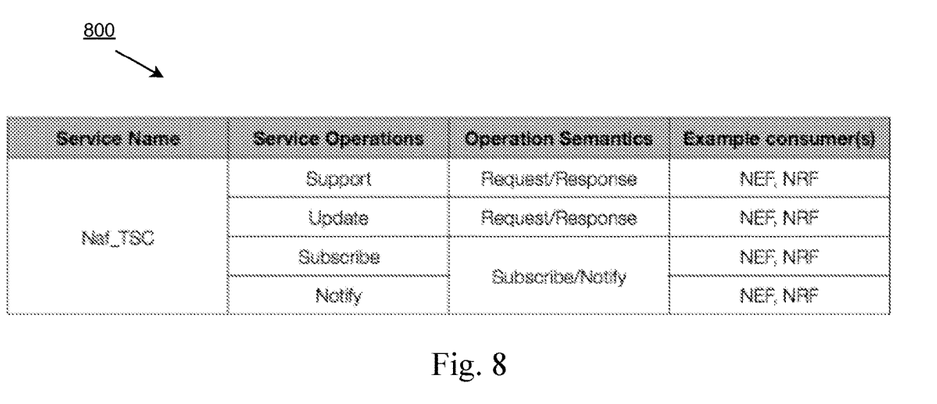
FIG. 8 shows AF services which may be used to provide AF capabilities from an AF to a network exposure function (NEF) or a network function (NF) repository function (NRF) according to various exemplary embodiments.

FIG. 8 shows AF services 800 which may be used to provide AF capabilities from an AF 144 to the NEF 136 or NRF 138 according to various exemplary embodiments. The Naf_TSC_Support_Request and Naf_TSC_Support_Response services may be used to send the TSN AF capability between the AF 144 and the NEF 136/NRF 138.

The Naf_TSC_Update services may be used by the AF 144 to update NEF 136/NRF 138 when there is any change in the TSN AF capability. An example may include support of a new IioT application type. The Naf_TSC_Subscribe and Naf_TSC_Notify services may be used to allow the consumers NEF 136 and NRF 138 to subscribe and be notified whenever there is a change in capability of the AF 144.

Figure 9:
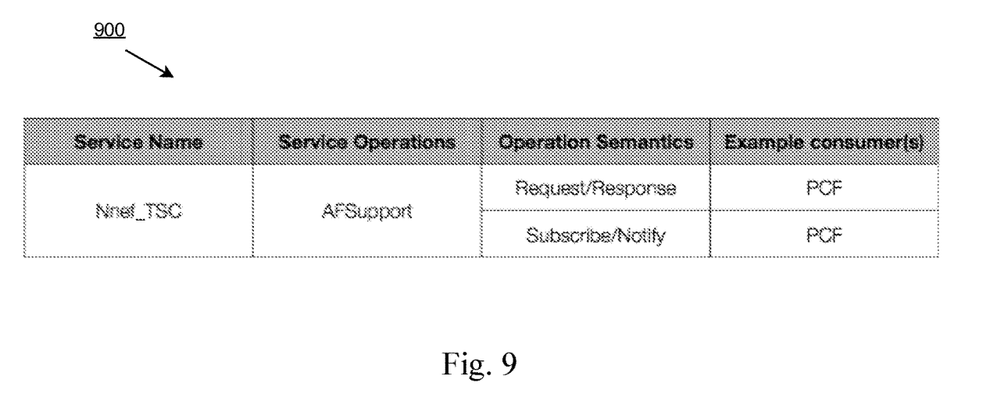
FIG. 9 shows NEF services which may be used to provide AF capabilities from the NEF to a PCF according to various exemplary embodiments.

FIG. 9 shows NEF services 900 which may be used to provide AF capabilities from the NEF 136 to the PCF 140 according to various exemplary embodiments. The Nnef_TSC_AFSupport_Request and Nnef_TSC_AFSupport_Response services may be used by the PCF 140 to retrieve the TSN AF address supporting an IIoT application. The Nnef_TSC_AFSupport_Notify service may be used by the AF 144 to notify the PCF 140 in case of any change in the address of TSN AF.

Figure 4A:
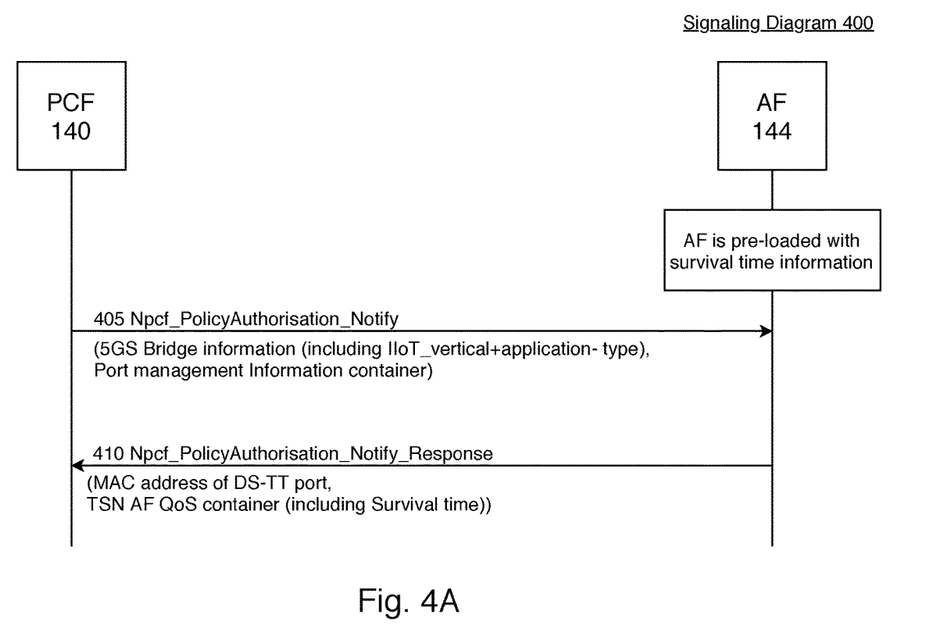
FIG. 4a shows a first exemplary signaling diagram for providing time sensitive communication (TSC) support information to a policy control function (PCF) according to a various exemplary embodiments.
Figure 4B:
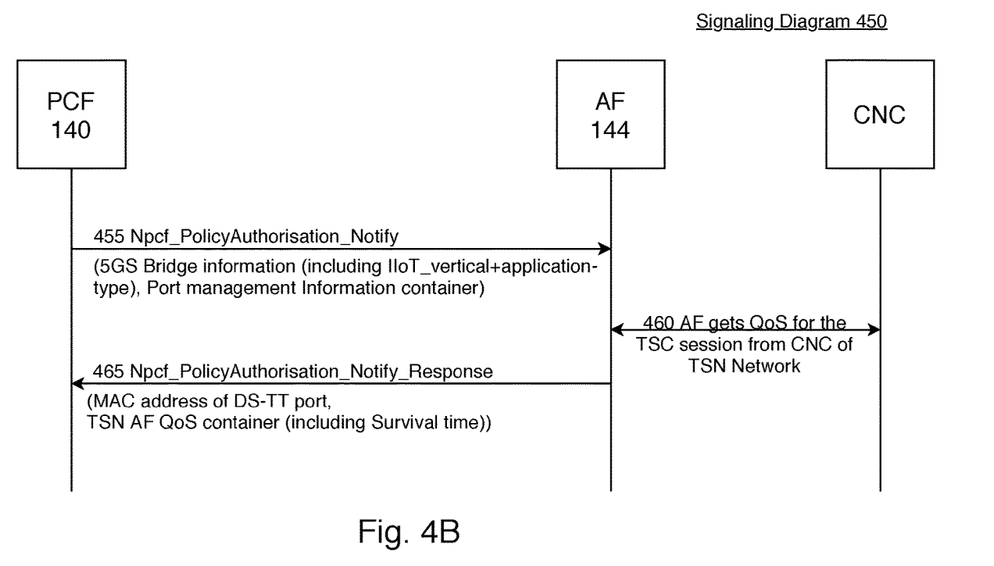
FIG. 4b shows a second exemplary signaling diagram for providing TSC support information to the PCF according to various exemplary embodiments.

FIGS. 4a and 4b describe various manners of the AF 144 obtaining the survival time information that is provided to the PCF 140. FIG. 4a shows a first exemplary signaling diagram 400 for providing TSC support information to a PCF 140 according to various exemplary embodiments. In this exemplary embodiment, it may be considered that the TSN AF 144 may be preloaded with the survival time for the TSC vertical/application. For example, the 3GPP TS 22.104 standard includes information (e.g., survival time) for various TSC verticals/applications. The information for the vertical/information being supported by the TSN AF 144 may be preloaded to the TSN AF 144.

In this scenario, as shown in 405, the PCF 140 may include a request for IIoT vertical and/or application type(s) in a policy authorization notification on the Npcf interface, e.g., an Npcf_PolicyAuthorisation_Notify service including 5GS bridge information and a port management information container that is transmitted to the TSN AF via the NEF/NRF. In 410, the AF 144 may include the survival time along with other QoS parameters and transmit the survival time to the PCF 140 as part of the TSN AF QoS Container included in a policy authorization response on the Npcf interface, e.g. an Npcf_PolicyAuthorisation_Notify_Response service that also includes the MAC address of the DS-TT port.

In other exemplary embodiments, the TSN AF 144 may request the survival time from the TSN. For example, the TSN AF 144 may request the centralized network configuration (CNC) of the TSN to provide the survival time as part of the QoS requirements. FIG. 4b shows a second exemplary signaling diagram 450 for providing TSC support information to the PCF 140 according to various exemplary embodiments. The signaling includes a request 455 signaled to the TSN AF 144 by the PCF 140. The request 455 is similar to the request 405 described above. After receiving the request 455, the TSN AF 144, in 460, requests the CNC of the TSN to provide the survival time as part of the QoS requirements. After receiving the survival time and other QoS requirements from the CNC, the AF 144 transmits the response 465. Again, the response 465 is similar to the response 410 described above.

Figure 5:
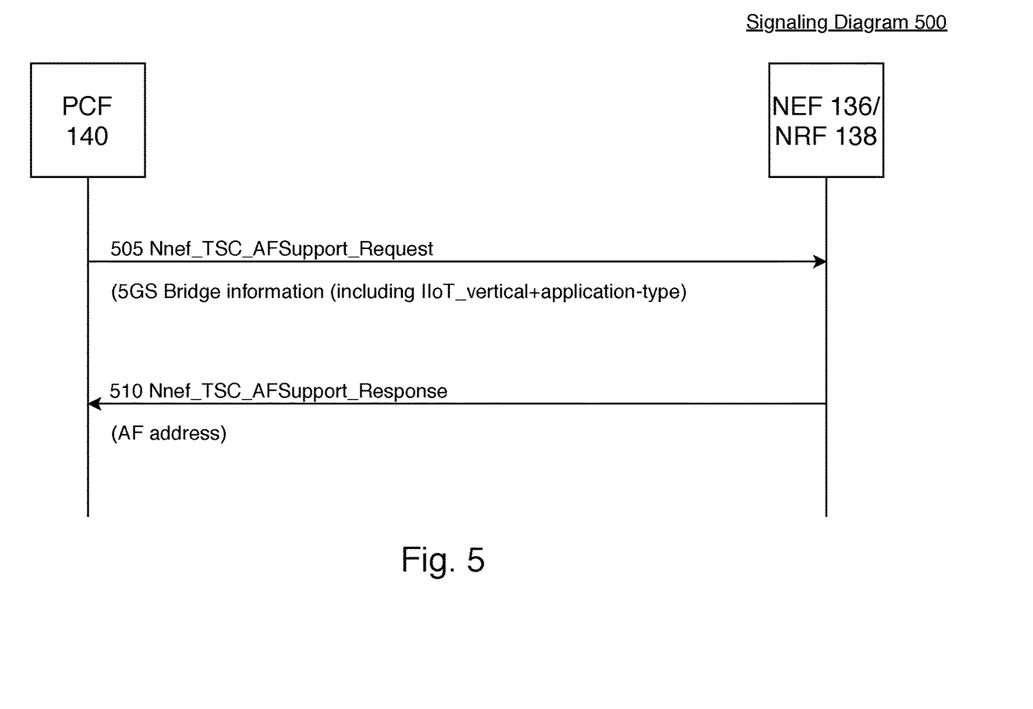
FIG. 5 shows an exemplary signaling diagram for the PCF to obtain a TSN AF address according to various exemplary embodiments.

FIG. 5 shows an exemplary signaling diagram 500 for the PCF 140 to obtain a TSN AF 144 address according to various exemplary embodiments. The PCF 140 may obtain information to understand the TSN AF 144 address from which to request the QoS capability information, including the survival time. In some exemplary embodiments, the PCF 140 may receive the address for the particular TSN AF 144 from the NEF 136/NRF 138.

In 505, the PCF 140 transmits a TSC AF support request including the IIoT vertical/application in the 5GS bridge information. The 5GS bridge information is described in greater detail below with respect to the signaling diagram of FIG. 6. Either one of the NEF 136 or the NRF 138 may have the TSN AF 144 information saved. The NEF 136 or the NRF 138 may store the TSN AF 144 information in, for example, a mapping table that stores correlations between various TSN AFs 144 and corresponding IIoT verticals/applications. The process for determining the TSN AF 144 information will be described in further detail below with respect to the method 700 of FIG. 7. When the NEF 136 is used, the PCF 140 may use an Nnef_TSC_AFSUpport_Request service on the Nnef interface to request the TSN AF 144 address(es) for the IIoT vertical/application. When the NRF 138 is used, the PCF 140 may use an Nnrf_TSC_AFSUpport_Request service on the Nnrf interface to request the TSN AF 144 address(es) for the IIoT vertical/application.

In 510, the NEF 136/NRF 138 transmits a TSC AF support response including the AF 144 address(es) for the TSN AF(s) 144 connected to the 5GC 130 via the NEF 136/NRF 138 and the IIoT support provided by each TSN AF 144. When the NEF 136 is used, the NEF 136 may use an Nnef_TSC_AFSUpport_Response service on the Nnef interface to provide the TSN AF 144 address(es) to the PCF 140. When the NRF 138 is used, the NRF 138 may use an Nnrf_TSC_AFSUpport_Response service on the Nnrf interface to provide the TSN AF 144 address(es) to the PCF 140.

In some exemplary embodiments, the NRF 138 may have the capability information stored but the PCF 140 may request the capability information from the NEF 136. In such a scenario, the NEF 136 may first retrieve the AF 144 address from the NRF 138 and then provide the AF 144 address to the PCF 140.

Figure 6:
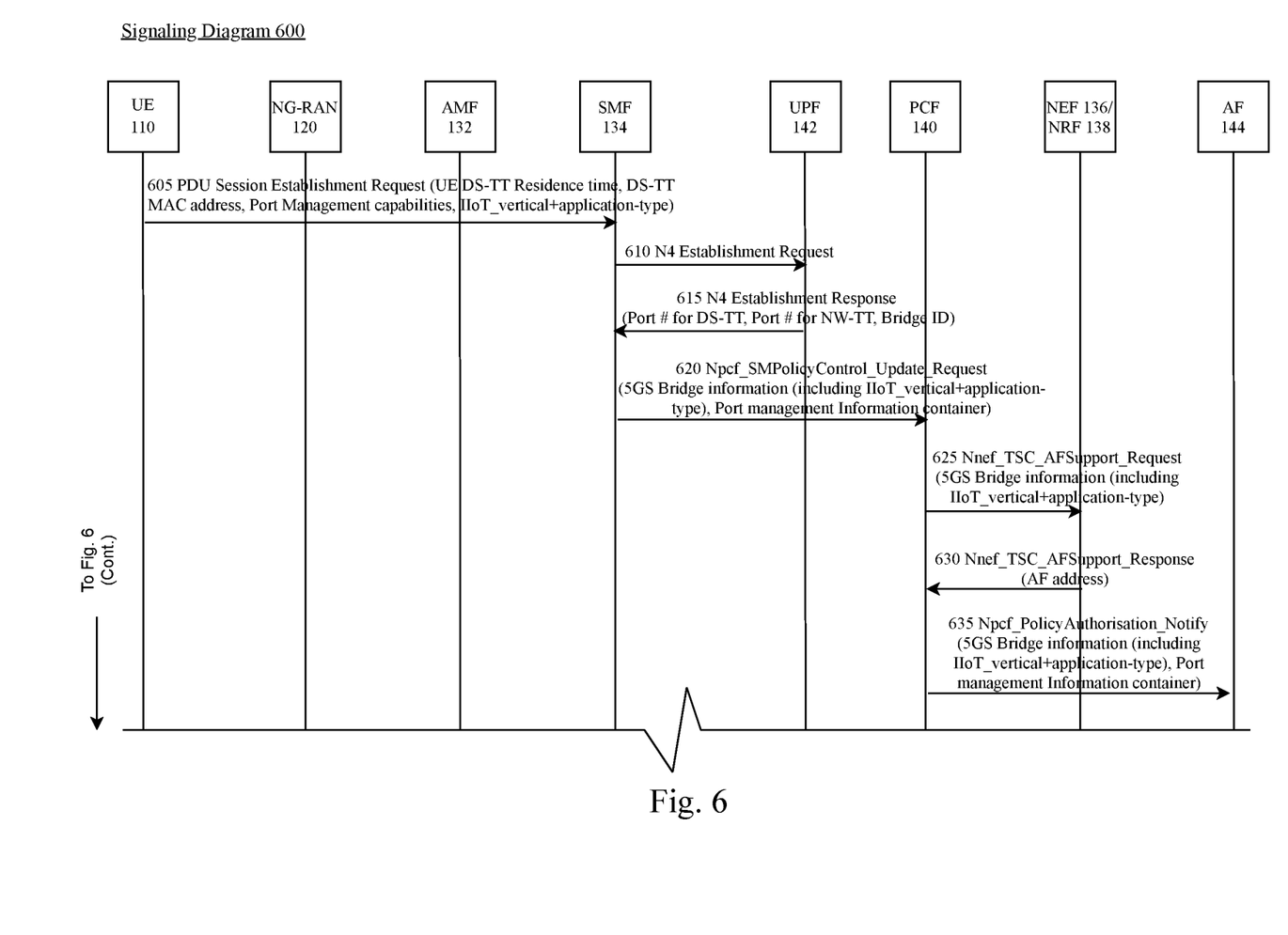
FIG. 6 shows a signaling diagram for a 5G core network (5GC) to discover a survival time for a UE in a TSN network and establish a PDU session with the UE according to various exemplary embodiments.

FIG. 6 shows a signaling diagram 600 for a 5GC 130 to discover a survival time for a UE 110 in a TSN network and establish a PDU session with the UE 110 according to various exemplary embodiments. In 605, the UE+DS-TT 110 (device-side TSN translator) initiates a PDU session establishment request with the SMF 134 of the 5GC 130 via the AMF 132. The UE 110 may include a plurality of IEs in the request message including a UE DS-TT residence time, a DS-TT MAC address, port management capabilities and an IIoT vertical/application type. The UE 110 may send multiple IIoT vertical/application types in the same PDU request or may create separate PDU sessions for each IIoT application type.

In 610, the SMF 134 selects a suitable UPF 142 for the TSC session based on the parameters included in the PDU session establishment request and transmits an N4 Establishment Request to the UPF+NW-TT 142 (network-side TSN translator). In 615, the UPF+NW-TT 142 assigns a port number and transmits an N4 Establishment Response to the SMF 134. The response includes a plurality of IEs including the port number for the DS-TT, the port number for the NW-TT, and a bridge ID.

In 620, the SMF 134 encapsulates the IEs received in 605 and 615 into a "5GS Bridge Information" and transmits the bridge information to the PCF 140 in a request for the Policy and Charging Control (PCC) rules for setting up a QoS for the session. For example, the SMF 134 may use an Npcf_SMPolicyControl_Update_Request service including the 5GS Bridge Information and the port management information container.

In 625, the PCF 140 requests the NEF 136/NRF 138 to provide the address of the suitable TSN AF 144 for the IIoT vertical/application type. In 630, the NEF 136/NRF 138 provides the PCF 140 with the TSN AF 144 capability information. The messaging 625 and 635 was described in detail above with respect to FIG. 5.

In 635, the PCF 140 contacts the TSN AF 144 identified in 630 and requests the QoS parameters for the TSC session. For example, the PCF 140 may use an Npcf_PolicyAuthorisation_Notify service including the 5GS Bridge Information and the port management information container. As described above, the 5GS bridge information includes the IIoT vertical+application type and the port management information container includes the port capabilities of the DS-TT and NW-TT.

In 640, the TSN AF 144 provides the QoS parameters for the requested TSC session as part of a TSN AF QoS container. For example, the TSN AF 144 may use an Npcf_PolicyAuthorisation_Notify service including the MAC address of the DS-TT port and the TSN AF QoS container. The container includes the survival time along with the other QoS parameters. The process for the TSN AF 144 to obtain the QoS parameters and survival time will be described in further detail below with respect to the signaling 400 of FIG. 4A and the signaling 450 of FIG. 4B.

In 645, the PCF 140 creates the PCC rules and transmits the PCC rules to the SMF 134. For example, the PCF 140 may use an Npcf_SMPolicyControl_Update_Response service including the PCC rules. The PCC rules include a QoS provided at the SDF level with 5QI, the survival time, and the MAC address of the DS-TT port. In 650, the SMF 134 provides the QoS information to the AMF 132. For example, the SMF 134 may use an Namf_Communication_N1N2MessageTransfer service including the QoS information. The QoS information includes a PDU Session ID, CN tunnel information, a QoS profile (5QI, QFI, survival time), and SMF-derived CN-assisted RAN parameters tuning.

In 655, the AMF 132 forwards the QoS information received in 650 to the 5G RAN 120 (e.g., the gNB 120A) to set up an N3-tunnel. For example, the AMF 132 may use a PDU Session Resource Setup Request including the parameters for a PDU session ID, CN tunnel info, a QoS profile with QFI (including survival time), an NAS PDU, and UL NG-U UP TNL information. In 660, the 5G RAN 120 transmits a PDU Session Resource Setup Response to the AMF. In 665, the AMF 132 transmits a PDU Session Establishment Accept message to the UE 110. The message includes the QoS flow with 5QI values and survival time information.

Figure 7:
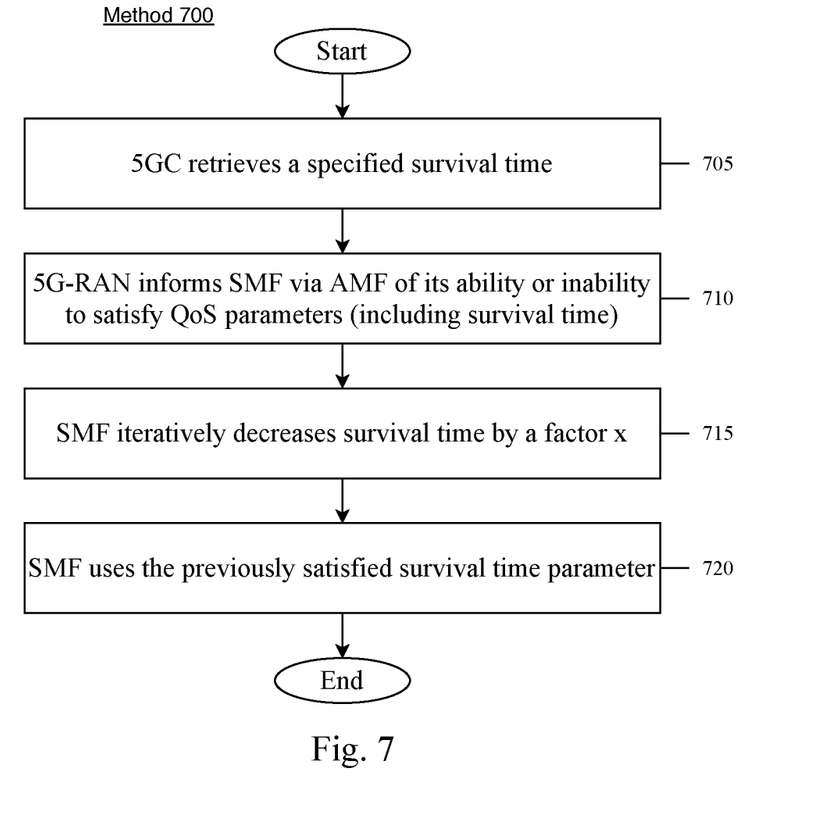
FIG. 7 shows a method for a telescopic approach to determining a survival time for a TSN UE.

FIG. 7 shows a method 700 for a telescopic approach to determining a survival time for a TSN UE. In 705, the 5GC 130 retrieves a specified survival time. Various manners of the 5GC 130 obtaining the survival times have been described above. In one example, the survival time may be 50 ms.

In 710, the 5G-RAN 120 informs the SMF 134 via the AMF 132 of its ability or inability to satisfy the QoS parameters (including survival time). If the 5G-RAN 120 is able to satisfy the QoS parameters the method continues to 715. Otherwise, the 5GC 130 is considered unavailable and the method ends.

In 715, the SMF 134 iteratively decreases the survival time by a factor x. For example, the factor x may be 20%. Thus, if the specified survival time is 50 ms, the survival time would be decreased to 40 ms. The SMF 134 may continue decrementing the survival time by the factor x until the 5G RAN 120 is unable to satisfy the parameter. In 720, when the 5G RAN 120 is ultimately unable to satisfy the decremented survival time parameter, the SMF 134 may return to and continuously use the previously satisfied survival time parameter, e.g., the lowest survival time value that the 5G RAN 120 is known to have satisfied. Thus, in this manner, the 5GC 130 may iteratively set the survival time for a particular vertical/application being executed by a UE 110.

When the 5G RAN 120 is unable to satisfy the survival time parameter, the 5G RAN 120 may determine the action that is to be performed. For example, the UE 110 may inform the 5G RAN 120 about survival time status through an ACK message. The UE 110 may, for example, for every DL packet received from the gNB 120A, send an acknowledgement (ACK) to the gNB 120A. The UE 110 may include an IE related to survival time in the ACK message. For example, the ACK message may include both the ACK and a survival time "OK" or not-OK ("NOK") IE. When the gNB 120A receives a NOK along with the ACK, the gNB 120A will understand that the UE 110 has not received any command within the survival time window and the IIoT application could not continue without any new command. The gNB 120A may then inform the SMF 134 that the QoS cannot be guaranteed for the TSC session. The SMF 134 may then instruct the gNB 120A to perform various operations with respect to the PDU session. For example, the SMF 134 may instruct the gNB 120A to tear down the RRC connection and N3-tunnel to reestablish the session with an updated QoS.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A method, comprising:
at a fifth-generation core network (5GC) providing 5G radio access network (RAN) services to a user equipment (UE) in a time-sensitive communications (TSC) network (TSN):
receiving a protocol data unit (PDU) session establishment request from the UE;
identifying a TSN application function (AF) for the PDU session;
determining quality of service (QoS) parameters for communications between the UE and the 5G RAN based on the identified TSN AF, the QoS parameters including a survival time provided by the TSN AF in a message container; and
establishing a PDU session with the UE when the QoS parameters including the survival time are satisfied.

2. The method of claim 1, further comprising:
signaling, from one of a network exposure function (NEF) or a network function (NF) repository function (NRF) to the TSN AF, a first TSC support request for an application type served by the TSN AF; and
signaling, from the TSN AF to the one of the NEF or NRF, a TSC support response including the application type.

3. The method of claim 2, further comprising:
signaling, from a policy control function (PCF) to the one of the NEF or NRF, a second TSC support request; and
signaling, from the one of the NEF or NRF to the PCF, a second TSC support response.

4. The method of claim 1, further comprising:
maintaining, by one of a network exposure function (NEF) or a network function (NF) repository function (NRF), a repository of AF identifiers (IDs) and respective application types.

5. The method of claim 4, further comprising:
signaling, from a policy control function (PCF) to the one of the NEF or NRF, a TSC support request for an identification of an TSN AF address; and
signaling, from the NEF or NRF to the PCF, the TSN AF identification.

6. The method of claim 1, wherein the TSN AF is preloaded with the survival time.

7. The method of claim 1, further comprising:
requesting a centralized network configuration (CNC) of the TSN to provide the survival time in the QoS parameters; and
receiving the survival time from the CNC.

8. The method of claim 1, further comprising:
receiving the survival time for the TSN UE;
receiving, from the 5G RAN, an indication of whether the 5G RAN satisfies the survival time.

9. The method of claim 8, further comprising:
when the 5G RAN satisfies the survival time, iteratively decreasing the survival time by a factor until the 5G RAN cannot satisfy the survival time; and
when the 5G RAN cannot satisfy the survival time, using as the survival time a previous survival time that the 5G RAN was able to satisfy.

10. The method of claim 9, wherein the factor is 20%.

11. The method of claim 9, wherein the UE informs the 5G RAN of whether the survival time is satisfied by including an OK or NOK with an ACK transmitted when a downlink packet is received from a gNB.

12. A system, comprising:
one or more network components configured to provide a fifth-generation core network (5GC) providing 5G radio access network (RAN) services to a user equipment (UE) in a time-sensitive communications (TSC) network (TSN), the one or more network components configured to:
receive a protocol data unit (PDU) session establishment request from the UE;
identify a TSN application function (AF) for the PDU session;
determine quality of service (QoS) parameters for communications between the UE and the 5G RAN based on the identified TSN AF, the QoS parameters including a survival time provided by the TSN AF in a message container; and
establish a PDU session with the UE when the QoS parameters including the survival time are satisfied.

13. The system of claim 12, wherein the one or more network components are further configured to:
signal, from one of a network exposure function (NEF) or a network function (NF) repository function (NRF) to the TSN AF, a first TSC support request for an application type served by the TSN AF;
signal, from the TSN AF to the one of the NEF or NRF, a TSC support response including the application type;
signal, from a policy control function (PCF) to the one of the NEF or NRF, a second TSC support request for the application type; and
signal, from the one of the NEF or NRF to the PCF, a second TSC support response including the application type.

14. The system of claim 12, wherein the one or more network components are further configured to:
maintain, by one of a network exposure function (NEF) or a network function (NF) repository function (NRF), a repository of AF identifiers (IDs) and respective application types;
signal, from a policy control function (PCF) to the one of the NEF or NRF, a TSC support request for an identification of an TSN AF address relating to the application type; and
signal, from the NEF or NRF to the PCF, the TSN AF identification.

15. The system of claim 12, wherein the survival time for the TSN AF is one of (i) preloaded for the application type or (ii) received from
a centralized network configuration (CNC) of the TSN.

16. The system of claim 12, wherein the one or more network components are further configured to:
receive the survival time for the TSN UE;
receive, from the 5G RAN, an indication of whether the 5G RAN satisfies the survival time;

when the 5G RAN satisfies the survival time, iteratively decrease the survival time by a factor until the 5G RAN cannot satisfy the survival time; and when the 5G RAN cannot satisfy the survival time, use as the survival time a previous survival time that the 5G RAN was able to satisfy.

17. One or more non-transitory computer readable storage media comprising a set of instructions that when executed cause one or more processors to perform operations comprising:

receiving a protocol data unit (PDU) session establishment request from a user equipment (UE) in a time-sensitive communications (TSC) network (TSN);

identifying a TSN application function (AF) for the PDU session;

determining quality of service (QoS) parameters for communications between the UE and a 5G radio access network (RAN) based on the identified TSN AF, the QoS parameters including a survival time provided by the TSN AF in a message container; and establishing a PDU session with the UE when the QoS parameters including the survival time are satisfied.

18. The one or more non-transitory computer readable storage media of claim 17, wherein the operations further comprise:

signaling, from one of a network exposure function (NEF) or a network function (NF) repository function (NRF) to the TSN AF, a first TSC support request an application type served by the TSN AF;

signaling, from the TSN AF to the one of the NEF or NRF, a TSC support response including the application type;

signaling, from a policy control function (PCF) to the one of the NEF or NRF, a second TSC support request; and signaling, from the one of the NEF or NRF to the PCF, a second TSC support response.

19. The one or more non-transitory computer eadable storage media of claim 17, wherein the operations further comprise:

maintaining, by one of a network exposure function (NEF) or a network function (NF) repository function (NRF), a repository of AF identifiers (IDs) and respective application types;

signaling, from a policy control function (PCF) to the one of the NEF or NRF, a TSC support request for an identification of an TSN AF address; and signaling, from the NEF or NRF to the PCF, the TSN AF identification.

20. The one or more non-transitory computer readable storage media of claim 17, wherein the survival time for the TSN AF is one of (i) preloaded for application type or (ii) received from a centralized network configuration (CNC) of the TSN.

* * * * *

UNITED STATES PATENT AND TRADEMARK OFFICE
CERTIFICATE OF CORRECTION

PATENT NO. : 11,758,000 B2
APPLICATION NO. : 17/593672
DATED : September 12, 2023
INVENTOR(S) : Prabhakar et al.

It is certified that error appears in the above-identified patent and that said Letters Patent is hereby corrected as shown below:

In the Claims

Claim 19, Column 14, Line 9:
"The one or more non-transitory computer eadable" should read as "The one or more non-transitory computer readable"

Signed and Sealed this
Twenty-eighth Day of November, 2023

Katherine Kelly Vidal
*Director of the United States Patent and Trademark Office*